United States Patent [19]

Jedlicka

[11] 4,399,721
[45] Aug. 23, 1983

[54] WRENCH

[76] Inventor: Byrl A. Jedlicka, 15 Greenridge Dr., Decatur, Ill. 62526

[21] Appl. No.: 296,836

[22] Filed: Aug. 27, 1981

[51] Int. Cl.³ .............................................. B25B 13/00
[52] U.S. Cl. ........................................ 81/57.46; 81/54
[58] Field of Search .............. 81/57.29, 54, 57.46, 81/57.15, 57.33, 57.34

[56] References Cited

U.S. PATENT DOCUMENTS

| 1,245,921 | 11/1917 | Holdren | 81/57.29 |
| 2,475,606 | 7/1949 | Gagnon | 81/57.46 |
| 3,521,509 | 7/1970 | Duke et al. | 81/57.15 |
| 3,668,949 | 6/1972 | Walker | 81/57.46 |

FOREIGN PATENT DOCUMENTS 124018  2/1949  Sweden .............................. 81/57.29

Primary Examiner—James L. Jones, Jr.
Attorney, Agent, or Firm—McWilliams, Mann, Zummer & Sweeney

[57] ABSTRACT

A wrench for tightening and loosening turnbuckles and the like includes a body with a worm screw rotatably mounted therein. At least one retainer roller is secured to the body and functions to hold or retain a turnbuckle in engagement with the worm screw. An adapter is connected to the worm screw for coupling rotative energy to the worm screw.

5 Claims, 4 Drawing Figures

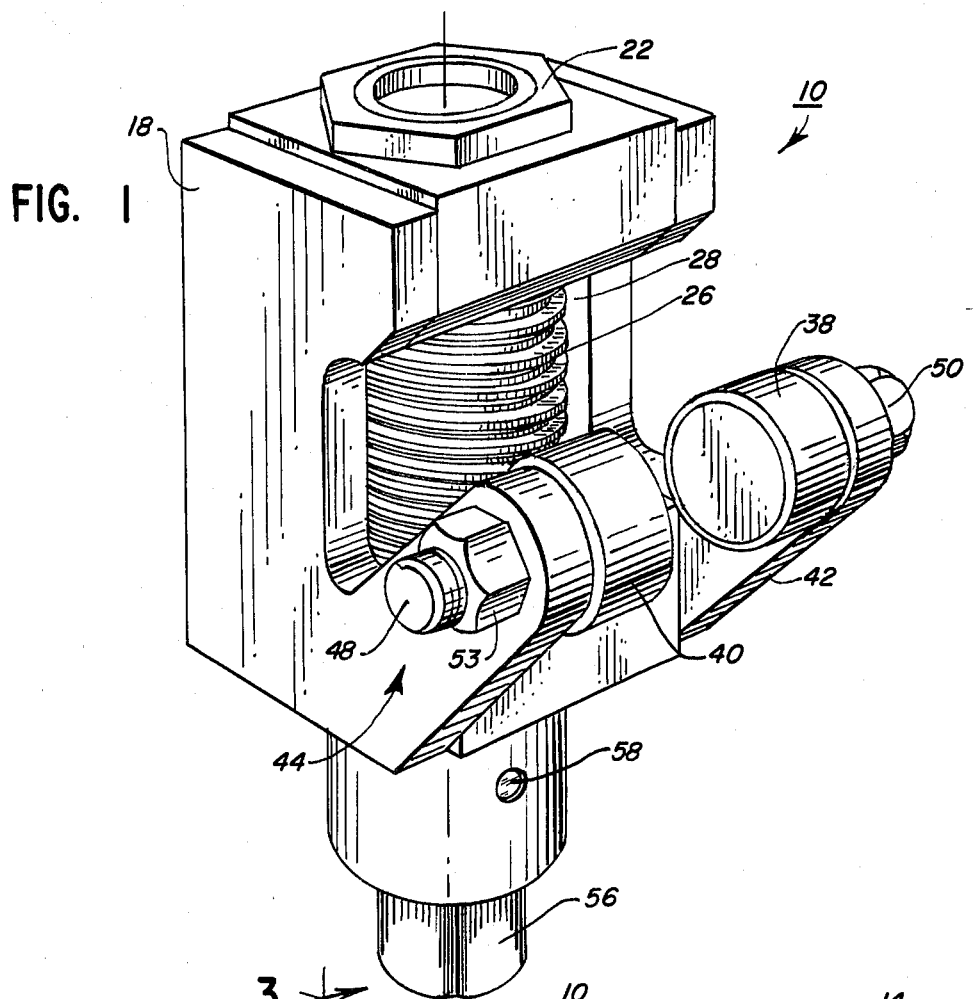
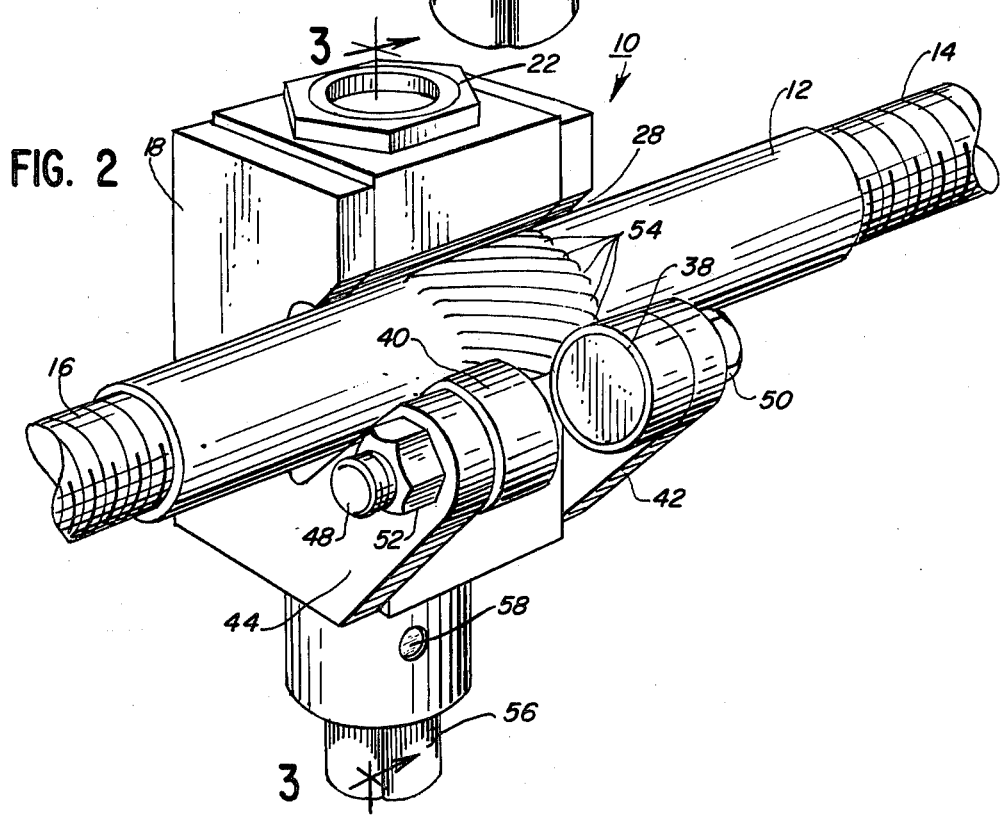

WRENCH

BACKGROUND OF THE INVENTION

1. Field of the Invention

The present invention relates to a new and improved device for tightening and loosening turnbuckles.

2. Description of the Prior Art

There are several prior art tools designed for tightening and loosening turnbuckles employed in truss holding systems in underground coal mining operations and the like. Such turnbuckles are typically made from one inch schedule 80 pipe swagged on each end and tapered for right and left hand threads. Turnbuckles as applied in such holding systems typically may be tightened or loosened by a wrench such as a pipe wrench or the like. These wrenches have the disadvantage of requiring substantial movement through an arc to tighten or loosen the turnbuckle and the space for moving the wrench is limited making it difficult to place the wrench on a turnbuckle.

SUMMARY OF THE INVENTION

An object of the present invention is to provide a new and improved wrench for tightening and loosening turnbuckles and the like.

Briefly, the present invention is directed to a new and improved wrench that may be used for tightening and loosening turnbuckles employed in a truss holding system in underground coal mining operations. The turnbuckles are typically fabricated from one inch scheduled 80 pipe swagged at each end and tapered for right and left hand threads. The device is a wrench including a body with a worm screw rotatably mounted therein. An adapter for coupling the turnscrew to a source of power is included. At least one retainer roller is mounted on the body for retaining a turnbuckle and positioning it in engagement with the worm screw.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 1 is a perspective view of a wrench constructed in accordance with the principles of the present invention;

FIG. 2 is a perspective view of a wrench with a turnbuckle mounted thereon;

DESCRIPTION OF THE PREFERRED EMBODIMENT

Figure 3:
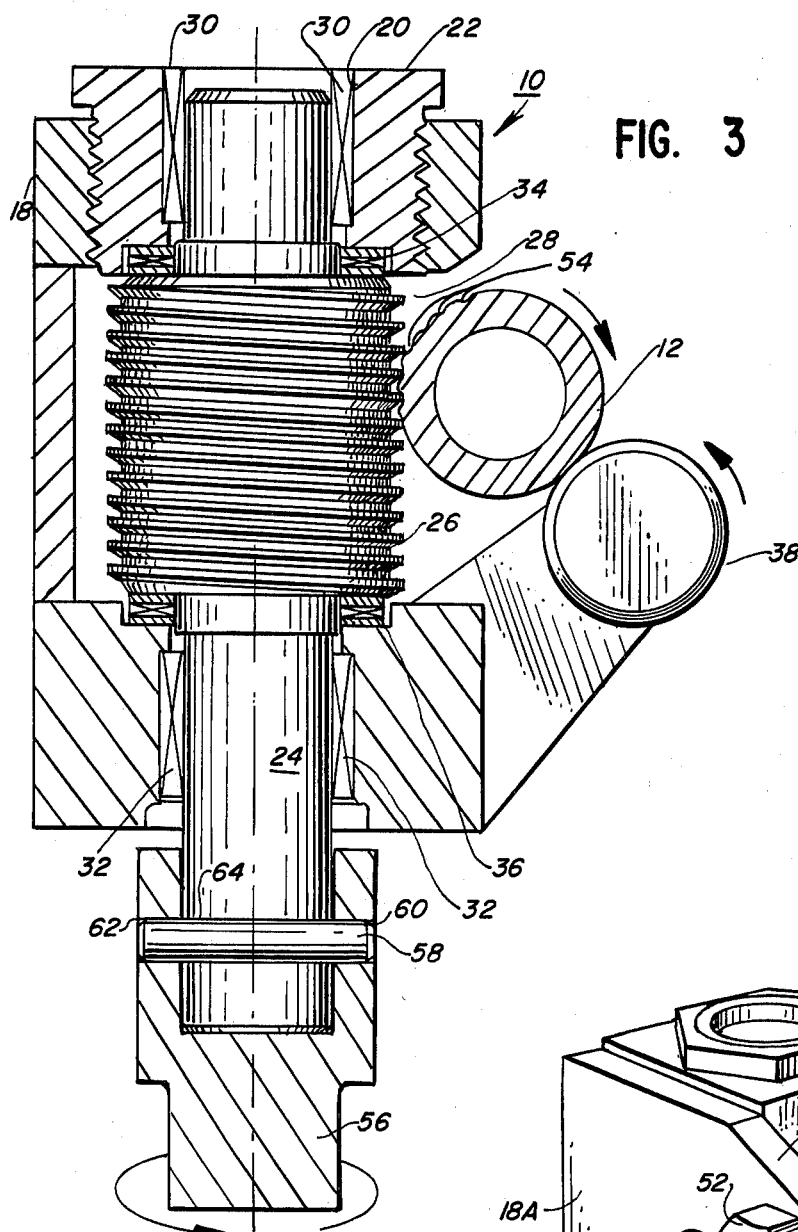
FIG. 3 is a view taken along 3—3 of FIG. 2.

With reference to FIGS. 1-3 there is illustrated a wrench generally designated by the reference numeral 10 constructed in accordance with the principles of the present invention. The wrench 10 is intended to be employed for tightening and loosening installed turnbuckles such as the turnbuckle 12 installed in a truss bolt system employed in underground coal mining operations. The turnbuckle 12 is made, for example, of a pair of one inch scheduled 80 pipe swagged on each end 14 and 16 and threaded for right hand threads, for example, on end 14 and left hand threads, for example, on end 16 for corresponding internal threaded engagement with the respective ends 15 and 17 of the familiar turnbuckle sleeve 19 that in practice has a relatively smooth external surface 21, and is of a predetermined size, and thus has a predetermined external surfacing cross dimension.

The wrench 10 includes a body 18 of generally parallelepiped configuration with a cylindrical bore 20 therethrough that at the upper end of same threadedly receives tubular, externally threaded cap 22. A worm screw 24 is mounted within the bore 20 and includes buttress threads 26 defined thereon to form the external threading of same. The buttress threads 26 are adjacent to and exposed at an opening 28 defined in the body 18 at one side of same, which opening 28 exposes a circumferential portion of the threads 26 at said side of the body 18. Upper 30 and lower 32 bearings encircle the screw 24 in journalling relation thereto within the bore 20 to allow rotation of the screw 24 relative to the body 18 about the screw longitudinal axis. Upper 34 and lower 36 thrust bearings are included above and below the buttress threads 26 to absorb shock experienced by the screw 24. Upper bearing 30 is disposed in cap 22 and the lower bearing 32 is disposed in the lower part of body 18.

It is intended for the teeth of the threads 26 to engage in impinging relation against and dig into the relatively smooth external surface 21 of the turnbuckle sleeve 19 thereby providing a coupling purchase on sleeve 19 and causing rotation of the installed turnbuckle sleeve in the desired manner as screw 24 is rotated. This is accomplished by engaging the turnbuckle sleeve 19, as disposed in body opening 28, against the threads 26 of the screw 24 through the employment of retainer rollers 38 and 40 that retain the sleeve 19 in place and serve as rotating treading for the sleeve 19 as sleeve 19 is rotated by screw 24. The retainer rollers 38 and 40 are rotatably mounted on arms 42 and 44, respectively, that are integrally defined on the body 18 and are proportioned in external diameter such that their peripheries extend or project into opening 28, so that turnbuckle sleeve 19 rides against same as indicated in FIGS. 2 and 3. The rollers 38 and 40 are secured to the arms 42 and 44, respectively, by bolts and nuts 50 and 52. As best seen in FIG. 3, upon placement of the wrench 10 onto the turnbuckle sleeve 19, as by the latter being disposed in opening 18 to seat the sleeve 19 against both the threads 26 and the rollers 38 and 40, with the threads 26 thus being in inpinging relation to the sleeve 19, and the wrench being operated to rotate the sleeve 19 in the direction indicated in FIG. 3, the threads 26 of screw 24 work against and dig into the turnbuckle sleeve 19 making slight cuts 54 therein, in making a purchase therein for turning the turnbuckle 12 in the desired manner, against the retaining action of rollers 38 and 40 that serve as a rolling abutment for sleeve 19.

The wrench 10 as described converts rotary motion about the axis of of the worm screw 24 into rotary motion of the turnbuckle sleeve 19 which is disposed at 90 degrees or crosswise of the driving member or worm screw 24. The rotary motion is imparted to the worm screw 24 by an outside power source (not shown) coupled to the worm screw 24 by an adapter 56 that is secured to the worm screw 24 by pin 58 extending through apertures 60 and 62 in the adapter 56 and a bore 64 in the worm screw 24.

Rollers 38 and 40 are journalled about a common axis that is perpendicular to an imaginary plane that includes the worm screw rotational axis that extends between rollers 38 and 40 (along the section line of FIG. 3), their peripheries forming a rolling abutment for sleeve 19. The common axis of rollers 38 and 40 is positioned relative to the threads 26, and the rollers 38 and 40 are proportioned, such that the peripheries of rollers 38 and 40 are spaced from threads 26 less than the size of the sleeve 19 (see FIG. 3).

Figure 4:
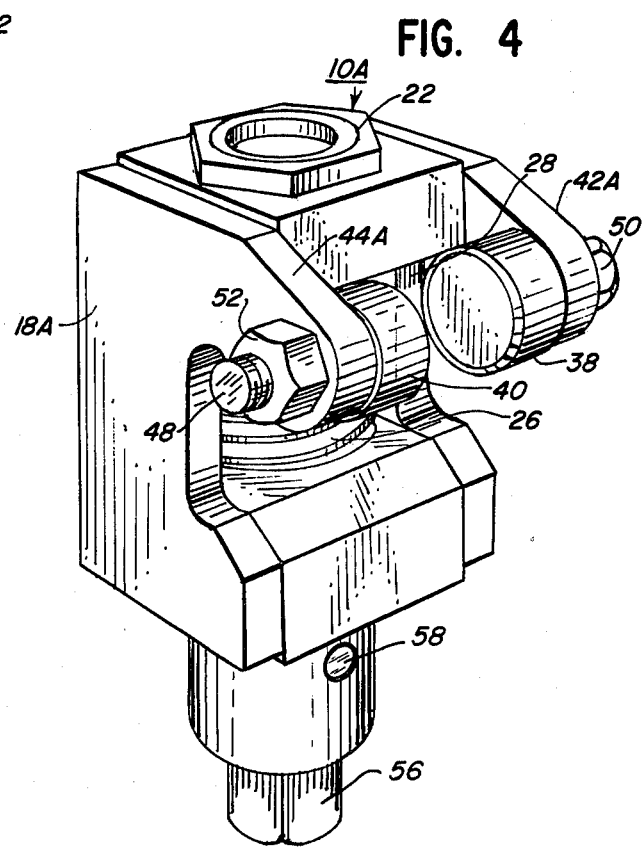
FIG. 4 is a perspective view of an alternative embodiment.

An alternative embodiment of the wrench 10 is illustrated in FIG. 4. The alternative wrench 10A includes many of the same parts of the wrench 10 and these similar or identical parts are designated by the same reference numeral employed in describing the wrench 10. Where there is a difference in the structure a suffix A is employed. The principal difference in the wrench 10A is the location of the arms 42A and 44A. As illustrated in FIG. 4 the body 18A of the wrench 10A includes arms 42A and 44A above the opening 28 as opposed to below the opening 28. This alternative structure allows the wrench 10A to be used in different conditions and space allocations than the wrench 10.

The retaining rollers 38 and 40 are illustrated in the embodiments of the wrenches 10 and 10A as being rigid and non-adjustable; however, the retainer rollers 38 and 40 may be pivoted against an adjustable stop allowing the wrenches 10 and 10A to be effective over a range of sizes of turnbuckles.

What is claimed and sought to be secured by Letters Patent of the United States is:

1. A wrench for tightening and loosening installed turnbuckles in which the turnbuckle is of the type comprising an externally smoothly contoured sleeve that at one end of same threadedly receives a first threaded member having a right hand thread and that at the other end of same threadedly receives a second threaded member having a left hand thread, with the sleeve being of a predetermined size, said wrench comprising:
a body,
a worm screw journalled in said body for rotational movement about the axis of same and having external worm threading thereon,
said body being formed to define an opening in which a circumferential portion of said worm screw threading at one side of said body is exposed,
and roller means journalled on said housing adjacent said opening and rotatable about an axis disposed at said side of said body and spaced from and extending across said body opening and extending substantially at right angles to the plane that includes said worm screw axis,
said roller means roller surfacing forming a rolling abutment for the turnbuckle sleeve to be seated against in applying the wrench exposed screw worm threading against the turnbuckle sleeve, with said roller means surfacing being separated from said exposed screw worm threading a distance that is less than the turnbuckle sleeve size,
whereby said wrench screw worm threading on said wrench being positioned to seat the turnbuckle sleeve simultaneously against same and said roller means, inpinges against the sleeve for effecting coupled relation of said threading to the sleeve on rotation of said screw worm, for adjusting the turnbuckle sleeve relative to the turnbuckle threaded members.

2. The wrench set forth in claim 1 wherein:
said roller means comprises a pair of rollers in spaced apart relation that are coaxial with said roller means axis.

3. The wrench set forth in claim 1 wherein:
said worm screw at one end of same includes an adapter for coupling said worm screw to a source of rotative power for rotating same about said worm screw axis.

4. The wrench set forth in claim 2 wherein:
said rollers of said pair of rollers are disposed to either side of said plane that includes said worm screw axis.

5. The wrench set forth in claim 2 wherein:
said roller means axis is fixed in its spacing from said screw worm threading.

* * * * *